Dec. 25, 1951     M. J. BOZICH     2,580,214
APPARATUS FOR UNLOADING PULVERULENT MATERIAL FROM A TANK
Filed Nov. 4, 1948
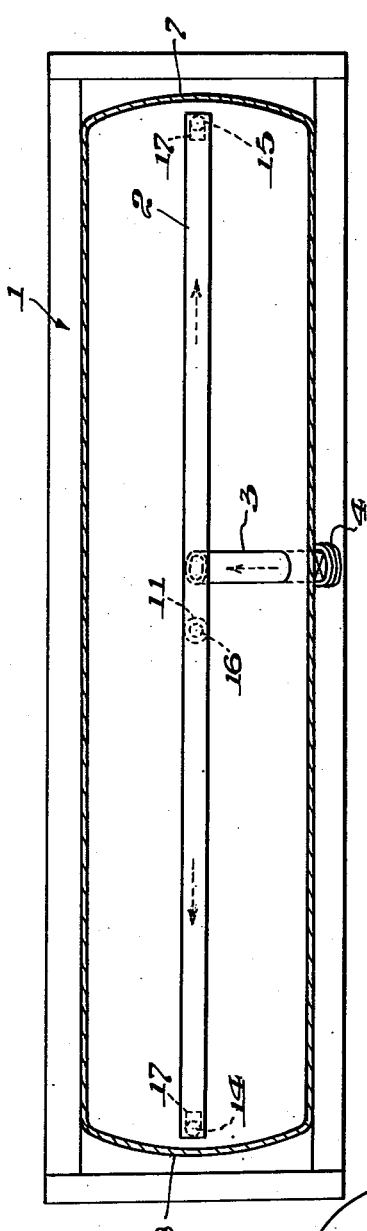
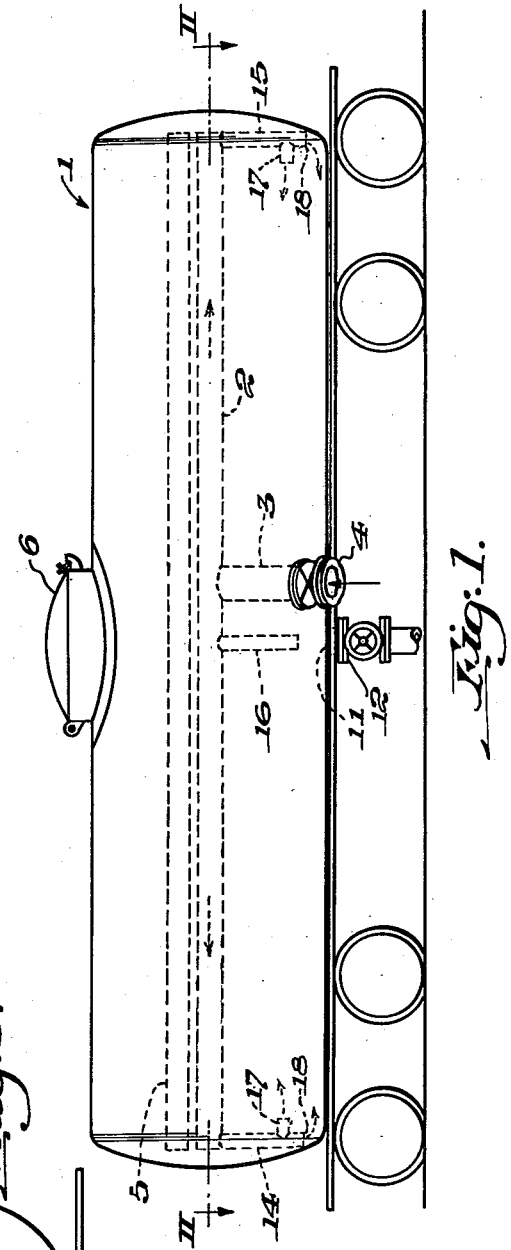
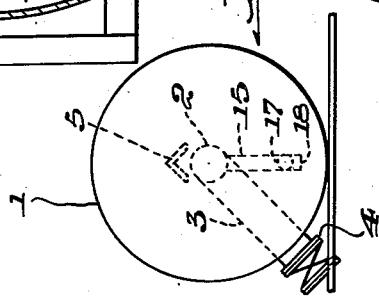
INVENTOR.
MICHAEL J. BOZICH.
BY Brown, Critchlow,
Flick & Peckham
his ATTORNEYS.

Patented Dec. 25, 1951

2,580,214

UNITED STATES PATENT OFFICE 2,580,214

APPARATUS FOR UNLOADING PULVERULENT MATERIAL FROM TANKS

Michael J. Bozich, Pittsburgh, Pa.

Application November 4, 1948, Serial No. 58,253

3 Claims. (Cl. 214—83.28)

This invention relates to cylindrical tanks for the transportation of dry pulverulent materials, such as grains, flour, chemical materials and the like, and is particularly applicable to railway automotive or shipboard tank cars.

In transporting such pulverulent materials, it is necessary to keep them absolutely dry, and, because such cylindrical closed and horizontally-disposed tanks can be sealed against the ingress of air, the desirability of using them has long been recognized. Until recently, however, such tanks have not been so used since it has been too difficult to unload them quickly and economically. In my copending patent application Serial No. 53,608, filed October 9, 1948, there is disclosed a method of unloading such dry pulverulent materials from these tanks and also pneumatic equipment for so doing the specific equipment there disclosed including air conduits within the tank, extending above its bottom from end to end thereof, the lower portions of the conduit being provided with a multiplicity of jets so arranged that a load of pulverulent material is unloaded through a discharge opening in the bottom of the tank at its center.

The object of this invention is to provide a horizontally disposed cylindrical tank with equipment, specifically different from that disclosed in my above-identified patent application, for unloading dry pulverulent material through a discharge opening in the bottom of the tank.

The preferred embodiment of the invention is illustrated in the accompanying drawings of which Fig. 1 is a somewhat diagrammatic illustration of a railway tank car equipped with specially-constructed pipes for supplying compressed air for unloading dry, pulverulent material from the tank; Fig. 2 a horizontal section taken on the line II—II of Fig. 1; and Fig. 3 a right-hand end view of the tank car shown in Fig. 1.

According to the invention, instead of supplying compressed air to the tank through jet openings formed in air conduits within the tank, as is disclosed in my previously-mentioned application, the compressed air is supplied through air blast pipes that extend downwardly from a centrally-located, longitudinally-projecting air conduit. Preferably, these air blast pipes are carried one at each end of the air conduit and another in the central portion of the tank car, and for purposes to be explained, the central air blast pipe is of smaller diameter than the end pipes. The load escapes from the tank through a valve-controlled discharge opening which is formed in the bottom of the tank car near its center, and, most suitably, in close proximity to the bottom end of the central air blast pipe. Also, it is desirable to form or provide the bottom portions of the end air blast pipes with T-sections which have one air escape orifice facing the central discharge opening and the other directed downwardly. The load is evacuated by connecting an air supply line to the central portion of the longitudinally extending air conduit within the tank. This supply line is connected to a source of compressed air, and, with the discharge opening opened and the air turned on, the unloading is accomplished first by gravity flow aided by the air driving through the center air blast pipe, and then by air driving through the end air blast pipes, and forcing the load from the ends toward the center and out through the discharge opening. The air flows out through the central air blast pipe, since that pipe provides the path of least resistance, the discharge opening being in close proximity to its bottom end. However, due to the fact that this central pipe is smaller in diameter than the end pipes, a back pressure is created in that pipe which causes the air also to flow out through the end pipes. As a result a tank load of the pulverulent material can be quickly evacuated and, in addition, it will be found that the tank is so thoroughly evacuated that no cleaning will be required to prepare the tank for another load. It should also be noted that, although the evacuation of finely divided material is contemplated, the apparatus provided by the invention is capable of unloading any material which is divided into particles that are sufficiently small to escape through the discharge opening.

In the embodiment of the invention illustrated in the drawings, a tank 1 of a railway tank car is shown as provided with an air conduit 2 which extends longitudinally and medially of the tank substantially from one end to the other, and, above the conduit is mounted a triangular baffle 5. This conduit may be supported within the tank by any suitable brackets, and, near its center, it is connected by an air supply line 3 that extends through the side wall of the tank near its bottom where it is provided with a coupling member 4 which is adapted to be connected to flexible conduit leading from a source of compressed air. The top of the tank is provided with an opening for loading it, the opening being adapted to be closed and sealed by a suitable cover 6 and, in addition, the opening in the side wall of the tank, through which air supply line 3 projects, is tightly sealed by any suitable packing.

As shown, the tank is perfectly cylindrical, and is provided with end walls 7 and 8 (Fig. 2) which, preferably, have their interior walls concavely curved. Centrally of the tank, its bottom is provided with a discharge opening 11, adapted to be closed or opened by any suitable valve arrangement, and into this opening is tightly fitted a pipe coupling 12 that is adapted to be connected to a suitable discharge line which will lead to the storage space into which the tank load is to be deposited.

The unloading of the tank is accomplished by directing, in a particular manner, blasts of compressed air against the load, and, for this purpose, pipes 14, 15 and 16, are provided, pipes 14 and 15 being carried at the ends of air conduit 2 and pipe 16 being carried centrally of this conduit. These pipes communicate with the air conduit and, as is shown, end pipes 14 and 15 have their bottom portions formed as T-sections each of which have an escape orifice 17 facing toward the discharge opening and another such orifice 18 directed downwardly against the bottom of the tank. Also, central air blast pipe 16 is smaller in diameter than end pipes 14 and 15, preferably being about one-half their diameter, and its bottom end is disposed in close proximity to the discharge opening.

The unloading is accomplished in the particular manner now to be described. When the discharge opening is initially opened, the portion of the load within the central portion of the tank flows by gravity through the opening and is blown toward the storage bin, the air blast driving through central pipe 16 augmenting this gravity discharge and carrying a good deal of the load in the center portion with it. Eventually, however, the load within the center portion of the tank reaches an angle of repose in which it no longer flows by gravity. Simultaneously with this gravity flow, the compressed air also is flowing out through the escape orifices in end pipes 14 and 15 this flow being insured by the fact that the central air blast pipe is smaller than the end pipes. As a result, the air blasts from these end pipes push against the load in the ends of the tank and cause the load in the center to again flow by gravity out through the discharge opening, this flow then being again assisted by the compressed air driving through central pipe 16. The inwardly directed orifices 17 of these end pipes are primarily responsible for pushing the load to the center of the tank while their downwardly directed orifices 18 insure that all of the particles in the bottom ends of the tank are evacuated with the result that the tank is thoroughly cleaned out. Triangular baffle 5, which, as stated, is mounted above air conduit 2, also insures a thorough cleaning in that it causes the particles to slide to the bottom of the tank and prevents them from being caught on the top of air conduit 2. Such a baffle is particularly desirable when the load is a very finely-divided material, such as flour.

As an example of a particular arrangement that has been found suitable for evacuating a load of grain, such as wheat, a cylindrical tank car of approximately six and one-half feet diameter may be equipped with a six inch air conduit 2, to which are connected air blast pipes 14 and 15 of four inch diameter and a central air blast pipe 16 of two inch diameter, this center pipe extending to within approximately one foot of the discharge opening. Also, the air supplied to these pipes may be under a pressure of about ten pounds per square inch. However, as indicated, the foregoing is simply a specific example of sizing, spacing and pressure, all of which are variable, and should be varied depending upon the density and character of the pulverulent material to be transported in the tank.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for transporting dry pulverulent material comprising a closed horizontally-disposed cylindrical tank having concave inner end walls and also having its bottom portion provided centrally with a discharge opening, an air conduit extending medially within the tank substantially from end to end thereof, a pair of air blast pipe carried one at each end of said conduit and each projecting downwardly to a position near the bottom of the tank, another air blast pipe carried centrally of the conduit and projecting downwardly in substantially axial alignment with said discharge opening to within a spaced distance of said opening, and means connected with the central portion of said air conduit for supplying it with compressed air to remove through said discharge opening a load of dry pulverulent material from the horizontally-disposed tank, said central air blast pipe being sufficiently smaller in diameter than said end air blast pipes to cause enough air to drive through the end pipes to move the pulverulent material to said discharge opening, said end air blast pipes each having an inwardly directed pipe section carried near its bottom for providing inwardly directed air escape orifices.

2. Apparatus for transporting dry pulverulent material comprising a closed horizontally-disposed cylindrical tank having concave inner end walls and also having its bottom portion provided centrally with a discharge opening, an air conduit extending medially within the tank substantially from end to end thereof, a pair of air blast pipes carried one at each end of said conduit and each projecting downwardly to a position near the bottom of the tank, another air blast pipe carried centrally of the conduit and projecting downwardly in substantially axial alignment with said discharge opening to within a spaced distance of said opening, and means connected with the central portion of said air conduit for supplying it with compressed air to remove through said discharge opening a load of dry pulverulent material from the horizontally-disposed tank, said central air blast pipe being sufficiently smaller in diameter than said end air blast pipes to cause enough air to drive through the end pipes to move the pulverulent material to said discharge opening, said end air blast pipes each having inwardly and downwardly directed pipe sections carried near its bottom for providing inwardly and downwardly directed air escape orifices.

3. Apparatus for transporting dry pulverulent material comprising a closed horizontally-disposed cylindrical tank having concave inner end walls and also having its bottom portion provided centrally with a discharge opening, an air conduit extending medially within the tank substantially from end to end thereof, a pair of air blast pipes carried one at each end of said conduit and each projecting downwardly to a position near the bottom of the tank, another air blast pipe carried centrally of the conduit and projecting downwardly in substantially axial alignment with said discharge opening to within a spaced distance of said opening, means connected with the central portion of said air conduit for supplying it with compressed air to remove through said discharge opening a load of dry pulverulent material from the horizontally-disposed tank, and an elongated triangular baffle mounted above and extending substantially the full length of said air conduit, said central air blast pipe being sufficiently smaller in diameter than said end air blast pipes to cause enough air to drive through the end pipes to move the pulverulent material to said discharge opening, said end air blast pipes each having inwardly and downwardly directed pipe sections carried near its bottom for providing inwardly and downwardly directer air escape orifices.

MICHAEL J. BOZICH.

REFERENCES CITED

The following references are of record in the file of this patent:

UNITED STATES PATENTS

| Number | Name | Date |
|---|---|---|
| 1,120,535 | Pruden | Dec. 8, 1914 |
| 1,433,302 | Rothchild | Oct. 24, 1922 |
| 1,465,665 | Grindle | Aug. 21, 1923 |